Figure 1:
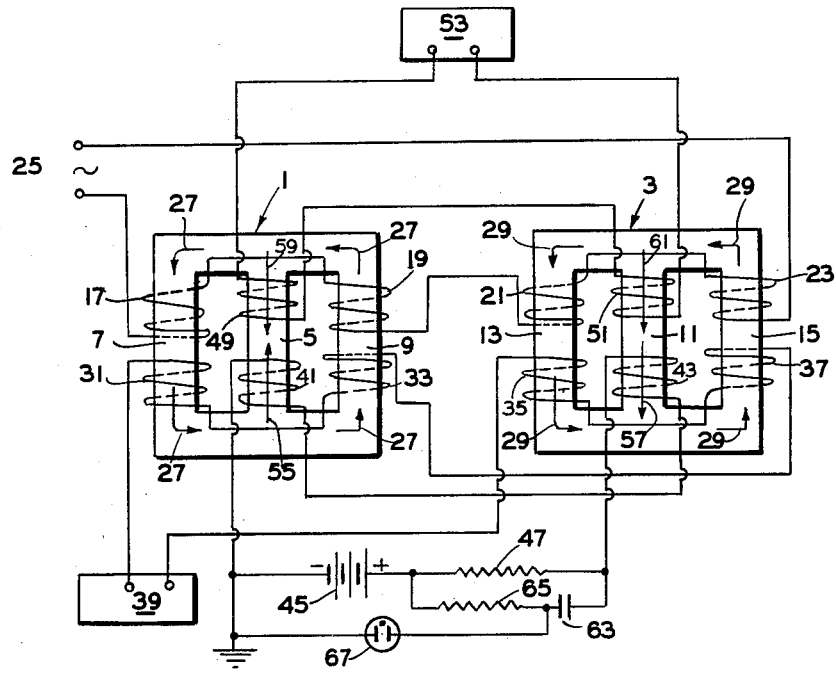

Jan. 15, 1957  A. BENNETT  2,777,986
CONTROL APPARATUS FOR SATURABLE CORE DEVICE
Filed June 1, 1950

INVENTOR.
ALFRED BENNETT
BY
ATTORNEY

United States Patent Office 2,777,986
Patented Jan. 15, 1957

2,777,986

CONTROL APPARATUS FOR SATURABLE CORE DEVICE

Alfred Bennett, New York, N. Y., assignor to Bendix Aviation Corporation, Teterboro, N. J., a corporation of Delaware Application June 1, 1950, Serial No. 165,508

10 Claims. (Cl. 323—56)

The invention relates to electrical control apparatus, and more particularly to apparatus responsive to a direct current control signal and producing an alternating current signal corresponding thereto.

The present invention in one aspect is an improvement on the Electrical Control Device of co-pending application Serial No. 700,234, filed September 30, 1946, granted May 11, 1954 as U. S. Patent No. 2,678,419 by the present inventor and assigned to a common assignee.

In the device of the earlier application, a pair of transformers having similar cores of magnetically permeable material are provided with primary windings energized by an alternating current source, bias windings energized by a direct current source, control windings responsive to direct current signals, and secondary windings providing a resultant alternating current signal corresponding to the direct current signal. A direct current control signal impressed on the control windings adds to the magnetic flux produced by the bias winding in one core and opposes the magnetic flux produced by the bias winding in the other core, and alternating current signals are induced by the excited primary windings in the secondary windings to develop in the output circuit a resultant alternating current signal corresponding to the direct current signal. However, when the D. C. control signal drops to zero, unequal residual magnetism in the cores, due to hysteresis, causes unequal alternating current signals to be induced in the secondary windings and hence a small resultant alternating current signal is developed. This is undesirable, particularly when the device is used as part of a blind landing system as described in the earlier application.

The main object of the present invention is to eliminate the small resultant alternating current signal developed when the D. C. control signal is zero.

The invention contemplates periodically producing in both cores magnetic flux of relatively large magnitude either opposing or supplementing the magnetic flux produced by the bias windings so that there is balanced residual magnetism in the cores when the direct current signal is zero, both cores having been periodically completely saturated by such periodic flux to remove the original residual magnetism, any residual magnetism present being small and equal in both cores and produced by the periodic flux. This may be accomplished by providing a pulsing circuit of any suitable kind connected to the bias windings or to separate windings on the cores to periodically energize the windings and produce equal flux in the cores so that both cores operate at a corresponding point on a hysteresis curve. With this arrangement, when the D. C. input signal is zero, the residual magnetism is equalized in both cores and the two transformers are balanced, and no A. C. signal output occurs.

The foregoing and other objects and advantages of the invention will appear more fully hereinafter from a consideration of the detailed description which follows, taken together with the accompanying drawing wherein two embodiments of the invention are illustrated. It is to be expressly understood, however, that the drawing is for the purposes of illustration and description only, and is not to be construed as defining the limits of the invention.

Figure 2:
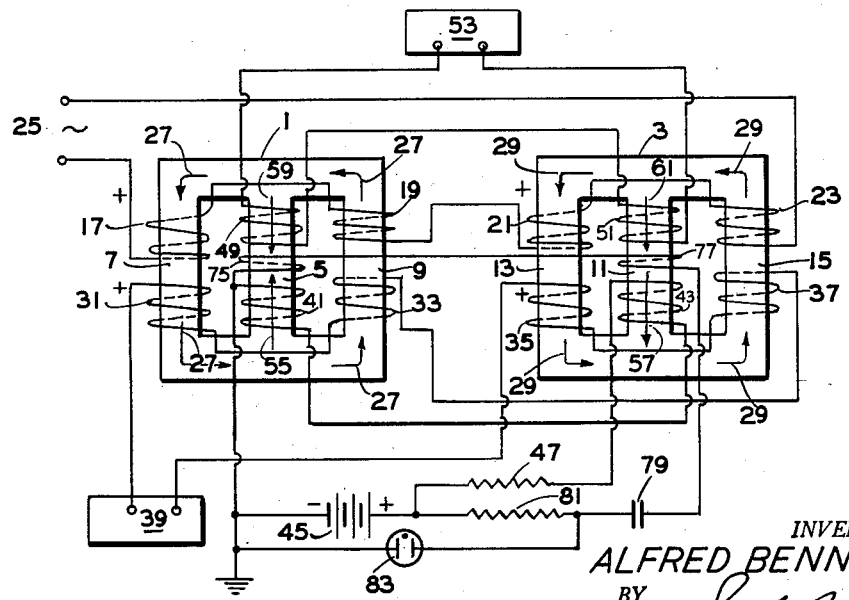

In the drawing, Figure 1 is a schematic diagram showing one embodiment of the invention, and Figure 2 is a schematic diagram corresponding to Figure 1 and showing another form of the invention.

Referring now to the drawing for a more detailed description of the novel electrical apparatus constituting the subject matter of the present invention, the latter is shown as including a pair of transformers having similar cores 1, 3 of magnetically permeable material, such as "Permaloy" or "Mumetal." Core 1 has a center leg 5 and spaced outer legs 7, 9 and core 2 has a center leg 11 and spaced outer legs 13, 15. Primary windings 17, 19 are wound on outer legs 7, 9, respectively, of core 1 and primary windings 21, 23 are wound on outer legs 13, 15, respectively, of core 3. The windings are connected in series aiding relation with one another and to a source 25 of alternating current so that windings 17, 19 aid one another in circulating magnetic flux, indicated by arrows 27, through the outer legs 7, 9 of core 1 and oppose one another in circulating magnetic flux through center leg 5. Also, windings 21, 23 aid one another in circulating magnetic flux, indicated by arrows 29, in outer legs 13, 15 of core 3 and oppose one another in circulating magnetic flux through center leg 11.

Secondary windings 31, 33 are wound on outer legs 7, 9, respectively, of core 1, and secondary windings 35, 37 are wound on outer legs 13, 15, respectively, of core 3. Windings 31, 33 are connected in series aiding relation with one another and windings 35, 37 are connected in series aiding relation with one another, but windings 31 and 33 are connected in series opposing relation to windings 35, 37. Windings 31, 33, 35, 37 are connected to a device 39 responsive to alternating current signals. With this arrangement alone, secondary windings 31, 33, 35, 37 provide no output signal to device 39 due to magnetic flux induced in outer legs 7, 9, 13 and 15 by primary windings 17, 19, 21, 23 because for any signal induced in secondary windings 31, 33 due to current flow in primary windings 17, 19, an equal and opposite signal is induced in secondary windings 35, 37 due to current flow in primary windings 21, 23.

A pair of direct current bias windings 41, 43 are wound on center legs 5, 11, respectively, of cores 1, 3 and are connected in series opposing relation with one another and to a D. C. power source 45 and a resistor 47. Energizing bias winding 41 by battery 45 causes magnetic flux to flow in center leg 5 of core 1 in the direction indicated by arrow 55, and energizing bias winding 43 by battery 45 causes magnetic flux to flow in center leg 11 of core 3 in the opposite direction indicated by arrow 57.

A pair of direct current control windings 49, 51 are wound on center legs 5, 11, respectively, of cores 1, 3 and are connected in series aiding relation with one another and to a D. C. signal source 53. Energizing control winding 49 by a D. C. signal of one polarity from source 53 produces magnetic flux in center leg 5 of core 1 in the direction indicated by arrow 59, that is, in opposition to the magnetic flux caused by bias winding 41, and energizing control winding 51 by the signal produces magnetic flux in center leg 11 of core 3 in the direction indicated by arrow 61, that is, in the same direction as magnetic flux caused by bias winding 43.

Energizing control windings 49, 51 by a D. C. signal of opposite polarity from signal source 53 produces flux in center legs 5, 11, respectively, in directions opposite to arrows 59, 61. Thus, in one core, the magnetic flux produced by the bias winding is aided by the magnetic flux produced by the control winding, and in the other core, the magnetic flux produced by the bias winding is opposed by the magnetic flux produced by the control winding. As a result, the transformers are unbalanced when a D. C. signal from signal source 53 is impressed on control windings 49, 51, and a resultant A. C. signal is induced in secondary windings 31, 33, 35, 37 to energize device 39, and the amplitude and phase of the A. C. signal is determined by the amplitude and polarity of the D. C' signal.

Because of unequal residual magnetism in the cores caused by hysteresis, a small but significant unbalance of the two transformers occurs when the signal from D. C. source 53 returns to zero, and consequently, null in the A. C. output circuit is not coincident with the zero D. C. signal.

The device described in detail above corresponds to the structure shown and described in the above application, and it is the effects of hysteresis that the present invention, described in detail below, overcomes.

In Figure 1, a pulsing circuit connected to bias windings 41, 43 provides a pulse voltage which momentarily reverses the magnetic flux in center legs 5, 11 of cores 1, 3 produced by the bias windings. The pulsing circuit includes a condenser 63 connected through a resistor 65 to the positive terminal of battery 45. A neon lamp 67 is connected in series with condenser 63 and bias windings 41, 43. Condenser 63 is charged by battery 45 through resistor 65 until the voltage across the condenser corresponds to the firing potential of neon lamp 67, whereupon the condenser discharges through the lamp and energizes bias windings 41, 43. The electrical values of resistor 65 and condenser 63 determine the frequency of discharge which preferably occur about once every three seconds. While condenser 63 is charging and considering the direction of conventional current flow which is opposed to the direction of electronic flow, current flows from the positive terminal of battery 45 through resistor 47, winding 43 and winding 41 to the negative terminal of battery 45. When condenser 63 discharges through neon lamp 67, condenser current of greater amplitude than the battery current or bias current flows momentarily through windings 41, 43 in the opposite direction, and the residual magnetism in cores 1, 3 equalizes and the two transformers are balanced so that the A. C. output is null or zero for zero D. C. input from source 53.

The arrangement shown in Figure 2 includes separate pulse windings 75, 77 wound on center legs 5, 11, respectively, of cores 1, 3 in a direction opposite to bias windings 41, 43. Pulse windings 75, 77 are connected to a pulsing circuit of the kind described above and including a condenser 79 charged through a resistor 81 by battery 45 and a neon lamp 83 in series with condenser 79 and pulse windings 75, 77. The pulsing circuit of Figure 2 operates in the same manner as the pulsing circuit of Figure 1 and provides magnetic flux in the cores of greater magnitude and in the same direction as the magnetic flux produced by bias windings 41, 43.

Because the relatively large pulse discharge current briefly completely saturates each core regardless of the direction of the relatively small bias current, it is immaterial whether the magnetic flux produced by the pulse current opposes the magnetic flux produced by the bias current in both cores, as in Figure 1, or whether the magnetic flux produced by the pulse current supplements the magnetic flux produced by the bias current in both cores, as in Figure 2. In both arrangements, the residual magnetism in the cores is equalized when the D. C. signal is zero and no output occurs, the original unequal residual magnetism having been removed so that any residual magnetism which is present is due to the pulse current and is equal in both cores and is of small magnitude.

Also, primary windings 17, 19 may be connected in series opposing relation to primary windings 21, 23 when secondary windings 31, 33 are connected in series aiding relation to secondary windings 35, 37. In addition, bias windings 41, 43 may be connected in series aiding relation when control windings 49, 51 are connected in series opposing relation. The above changes will not affect the ultimate result.

Although a specific form of oscillator for producing pulse voltages has been shown and described, it should be understood that any device which produces suitable pulses may be used.

Although but two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a device of the kind described, a pair of magnetically permeable cores, a primary winding on each of said cores adapted to be energized by an alternating current source, a biasing winding on each of said cores adapted to be energized by a direct current source and to produce a unidirectional magnetic flux in each of said cores, a control winding on each of said cores adapted to be connected to a source of direct current signals and arranged to decrease the unidirectional magnetic flux in one of said cores and to increase the unidirectional magnetic flux in the other of said cores in response to the direct current signals, a secondary winding on each of said cores adapted to be connected to a device responsive to alternating current signals and having induced therein alternating current signals corresponding to the direct current signals, and means to periodically produce equal unidirectional magnetic flux in said cores to provide balanced residual magnetism in said cores when the direct current signal is zero.

2. In a device of the kind described, a pair of magnetically permeable cores, a primary winding on each of said cores adapted to be energized by an alternating current source, a bias winding on each of said cores adapted to be energized by a direct current source and to produce a unidirectional magnetic flux in each of said cores, a control winding on each of said cores adapted to be connected to a source of direct current signals and arranged to decrease the unidirectional magnetic flux in one of said cores and to increase the unidirectional magnetic flux in the other of said cores in response to direct current signals, a secondary winding on each of said cores having induced therein alternating current signals corresponding to the direct current signals, and means connected to said bias windings for providing a pulsing current in said bias windings so that there is balanced residual magnetism in said cores when the direct current signal is zero.

3. In a device of the kind described, a pair of magnetically permeable cores, a primary winding on each of said cores adapted to be energized by an alternating current source, a bias winding on each of said cores adapted to be energized by a direct current source and to produce a unidirectional magnetic flux in each of said cores, a control winding on each of said cores adapted to be connected to a source of direct current signals and arranged to decrease the unidirectional magnetic flux in one of said cores and to increase the unidirectional magnetic flux in the other of said cores in response to direct current signals, a secondary winding on each of said cores having induced therein alternating current signals corresponding to the direct current signals, a pulse winding on each of said cores, and means connected to said pulse winding for providing a pulsing voltage to produce equal magnetic flux in said cores so that there is balanced residual magnetism when the direct current signal is zero.

4. In a device of the kind described, a pair of magnetically permeable cores, a primary winding on each of said cores adapted to be energized by an alternating current source, a bias winding on each of said cores adapted to be energized by a direct current source and to produce a unidirectional magnetic flux in each of said cores, a control winding on each of said cores adapted to be connected to a source of direct current signals and arranged to decrease the unidirectional magnetic flux in one of said cores and to increase the unidirectional magnetic flux in the other of said cores in response to direct current signals, a secondary winding on each of said cores adapted to be connected to a device responsive to alternating current signals and having induced therein alternating current signals correspondng to the direct current signals, and means for providing a pulsing voltage including a condenser connected to said bias windings and adapted to be charged by the direct current source, a gas-filled electron discharge device in circuit with said condenser to periodically discharge said condenser through the bias windings when the potential across said condenser corresponds to the firing potential of said discharge device to provide for current flow in a direction opposite to the direction of current flow provided by the direct current source.

5. In a device of the kind described, a pair of magnetically permeable cores, a primary winding on each of said cores adapted to be energized by an alternating current source, a bias winding on each of said cores adapted to be energized by a direct current source and to produce a unidirectional magnetic flux in each of said cores, a control winding on each of said cores adapted to be connected to a source of direct current signals and arranged to decrease the unidirectional magnetic flux in one of said cores and to increase the unidirectional magnetic flux in the other of said cores in response to direct current signals, a secondary winding on each of said cores adapted to be connected to a device responsive to alternating current signals and having induced therein alternating current signals corresponding to the direct current signals, a pulse winding on each of said cores, and means for providing a pulsing voltage including a condenser connected to said pulse windings and adapted to be charged by the direct current source, a gas-filled electron discharge device in circuit with said condenser to periodically discharge said condenser through said pulse windings when the potential across said condenser corresponds to the firing potential of said discharge device to produce magnetic flux in said cores greater than the magnetic flux produced by the bias windings.

6. In electrical control apparatus, a pair of magnetically permeable cores, a primary winding on each of said cores adapted to be energized by an alternating current source, a biasing winding on each of said cores adapted to be energized by a direct current source and to produce a unidirectional magnetic flux in each of said cores, a control winding on each of said cores adapted to be connected to a source of direct current signals and arranged to decrease the unidirectional magnetic flux in one of said cores and to increase the unidirectional magnetic flux in the other of said cores in response to the direct current signals, said cores having unequal residual magnetism due to said direct current signals when the direct current signal is zero, a secondary winding on each of said cores adapted to be connected to a device responsive to alternating current signals and having induced therein alternating current signals corresponding to the direct current signals, and flux-producing means for producing equal residual magnetism in said cores when the direct current signal is zero.

7. In electrical control apparatus, a pair of magnetically permeable cores, means for producing unidirectional magnetic flux in each of said cores, means responsive to variable signal voltages to decrease the magnetic flux in one of said cores and to increase the magnetic flux in the other of said cores, said cores having unequal residual magnetism due to said signal voltages when said signal voltage is zero and flux-producing means for periodically substantially completely saturating said cores for providing balanced residual magnetism in said cores when the variable signal voltage is zero.

8. In electrical control apparatus, a pair of magnetically permeable cores, means operative in response to variable signal voltages to change the magnitude of the magnetic flux in one of said cores relative to the magnitude of the flux in the other of said cores, and means automatically operative to produce equal total flux in each of said cores regardless of the difference in residual magnetism in said cores produced by said signal voltages so that both cores operate at a corresponding point on a hysteresis curve when said signal responsive means is inoperative in response to a zero signal voltage.

9. In electrical control apparatus responsive to input control signals, a pair of magnetically permeable cores having windings thereon adapted to be energized by a direct current source, an output electrical circuit responsive to the relative magnitude of the flux in said cores, said cores having unequal residual magnetism due to the input signals when the input control signal is zero, and means for providing balanced residual magnetism in said cores when the direct current is zero, said means including a pulse-producing circuit electrically coupled to said windings to pass pulsating current through said windings.

10. In electrical control apparatus, a pair of magnetically permeable cores having windings thereon adapted to be energized by direct current input signals, said cores having unequal residual magnetism due to said input signals when said input signal is zero a load device, an output winding on each of said cores connected in series-opposition with each other and in circuit with said load device, and means for providing equal total flux in each of said cores when the input signal is zero to develop equal signals in said output windings whereby a zero resultant signal is applied to said load device when the input signal is zero.

References Cited in the file of this patent
UNITED STATES PATENTS

| | | |
|---|---|---|
| 1,169,251 | Gaffney | Jan. 25, 1916 |
| 1,301,412 | Elmen | Apr. 22, 1919 |
| 1,824,577 | Sorensen | Sept. 22, 1931 |
| 1,981,921 | Logan | Nov. 27, 1934 |
| 1,997,657 | Schmutz | Apr. 16, 1935 |
| 2,315,093 | Languepin | Mar. 30, 1943 |
| 2,338,423 | Geyger | Jan. 4, 1944 |
| 2,343,199 | Moyer | Feb. 29, 1944 |
| 2,347,369 | Roters | Apr. 25, 1944 |
| 2,445,459 | Snyder | July 20, 1948 |
| 2,453,470 | Steinitz | Nov. 9, 1948 |
| 2,512,317 | Edwards et al. | June 20, 1950 |